United States Patent [19]

Hansen

[11] Patent Number: 4,542,713
[45] Date of Patent: Sep. 24, 1985

[54] KIT FOR MAKING AN ANIMAL MAZE

[76] Inventor: John M. Hansen, 38 Hill St., Williams Bay, Wis. 53191

[21] Appl. No.: 611,175

[22] Filed: May 17, 1984

[51] Int. Cl.⁴ ............................................ A01K 29/00
[52] U.S. Cl. ...................................................... 119/1
[58] Field of Search ................ 119/1, 29; 273/153 R; 272/19; 40/622, 611

[56] References Cited

U.S. PATENT DOCUMENTS

| | | | |
|---|---|---|---|
| 1,712,829 | 5/1929 | Klimowicz | 40/622 |
| 1,986,795 | 1/1935 | Cusick | 40/611 |
| 2,558,309 | 6/1951 | Mitten | 40/622 |
| 2,825,982 | 3/1958 | Gorden | 35/16 |
| 2,871,619 | 2/1959 | Walters | 46/19 |
| 3,260,236 | 7/1966 | Jones | 119/1 |
| 3,516,389 | 6/1970 | Meyer | 119/1 |
| 3,712,617 | 1/1973 | Ohlschlager | 273/153 R |
| 3,857,364 | 12/1974 | Miller, Jr. | 119/1 |

Primary Examiner—Hugh R. Chamblee
Attorney, Agent, or Firm—Fuller, House & Hohenfeldt

[57] ABSTRACT

A rugged and inexpensive kit for making an animal maze is especially suited for use by school children. The maze runways may be constructed in any configuration, including non-orthogonal. The kit comprises a plurality of partitions, each having at least one pointed fastener embedded in and projecting from an edge thereof. The partitions may be placed at any location on a bottom plate with the pointed fasteners in contact with the bottom plate. By pounding the partition edge opposite the fasteners, the fasteners are removably inserted into the bottom plate, thereby retaining the partition in an upright attitude. The fasteners are formed with annular flanges to prevent deeper embedding of the fasteners in the partitions with repeated use.

3 Claims, 5 Drawing Figures

KIT FOR MAKING AN ANIMAL MAZE

BACKGROUND OF THE INVENTION

1. Field of the Invention

This invention pertains to animal mazes, and more particularly to economical animal mazes capable of being quickly assembled into unlimited numbers of runway patterns.

2. Description of the Prior Art

Animal mazes are in widespread use both for serious laboratory study of the behavior of small animals and for the amusement of children watching their pets. An example of an animal maze is disclosed in U.S. Pat. No. 3,260,236, wherein a coated cardboard base is formed with numerous slots. The animal runways are made of elongated and bendable coated cardboard inserts having tabs which correspond with the slots in the base. A primary disadvantage of the anmimal maze of the U.S. Pat. No. 3,260,236 is the limited number of maze patterns available, because the placement of the inserts to create different runways is limited to the locations of the base slots and insert tabs. In addition, repeated assembly and disassembly of the inserts tends to damage and weaken the cardboard tabs and to enlarge the base slots, so that the tabs do not securely hold the inserts in place.

U.S. Pat. No. 3,516,389 discloses an animal maze having a base with numerous precision grooves that are deep enough to hold wall plates inserted therein in upright fashion. The base may be constructed in several pieces which are held together by their grip on a common wall plate engaged in the base pieces. The costliness of the numerous grooved pieces of the U.S. Pat. No. 3,516,389 is apparent. Further, maze patterns are restricted to the configurations provided by the grooved bases.

The maze of U.S. Pat. No. 3,857,364 employs a few standard parts for designing and building a large number of maze patterns. The maze device include a base having numerous holes distributed in a regular grid-like pattern. A series of grooved posts are provided with pegs for inserting into the base holes. The post grooves engage the wall panels. The disadvantage of the animal maze of the U.S. Pat. No. 3,857,364 is that non-orthogonal runways are not possible. A further drawback is that constructing a maze from the numerous small parts is a time-consuming task for children, who often do not possess the patience to construct an elaborate maze but rather want to promptly see their pet in action.

U.S. Pat. No. 2,825,982 shows a layout board in which map pins and tacks are pressed into a composition board to hold layout and templates to the board.

U.S. Pat. No. 2,871,619 discloses a kit for model buildings. The kit includes numerous structural forms that are permanently erected on a perforated base plate. The forms are provided with locating pins protruding downwardly therefrom to correspond with the base plate perforations. Concrete is poured into and around the forms to create a permanent model.

U.S. Pat. No. 3,712,617 describes a maze game. Mazes of different patterns are created by fixedly inserting a number of regularly spaced upstanding pegs into a board. The pegs are formed with quadrantly spaced slots to receive the ends of partition members. A sloted border is also employed. The maze of the U.S. Pat. No. 3,712,617 is essentially similar to that of the U.S. Pat. No. 3,857,364 described previously, and it suffers the same shortcomings as the U.S. Pat. No. 3,857,364.

Thus, a need exists for sturdy and inexpensive apparatus which may be quickly assembled into an unlimited number of runway patterns to create an animal maze.

SUMMARY OF THE INVENTION

In accordance with the present invention, an inexpensive kit for making an animal maze is provided which is capable of being assembled into an infinite variety of patterns in a quick and simple fashion. This is accomplished by apparatus which includes a plurality of partitions having projecting fastener points adapted to be removably inserted into a suitable bottom plate.

The bottom plate is preferably a sheet of plywood of suitable size. The partitions are preferably of solid wood. For economy and simplicity, the partitions are of two lengths and equal heights. The partitions are proportioned so as to be very sturdy and yet easily manipulable by children. Embedded in the lower edge of each partition are a pair of pointed fasteners. One end of the fasteners protrudes from the partition lower edge a distance less than the embedded length within the partition. The fasteners are preferably provided with an annular flange which is received in a suitable counterbore in the partition.

To construct an animal maze employing the kit of the present invention, it is necessary only to set the partitions in the desired location on the bottom plate and to pound the top edges of the partitions, thus forcing the pointed fasteners into the bottom plate. The fastener flanges prevent the fasteners from being driven further into the partitions. The plywood bottom plate is capable of gripping the fastener projections with sufficient force to hold the partitions sturdily in place. However, when desired, the maze may be easily disassembled by lifting the partitions from the bottom plate. Because the pointed fasteners are embedded more deeply in the partitions than in the bottom plate, the fasteners will remain embedded in the partitions.

Other objects, features, and advantages of the invention will become apparent to those skilled in the art from the disclosure.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
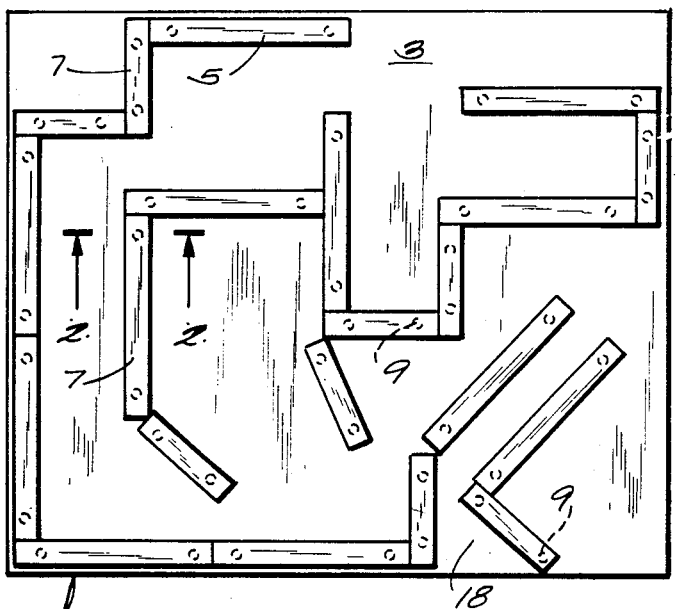
FIG. 1 is a top view of a typical runway pattern constructed with the animal maze kit of the present invention.
Figure 2:
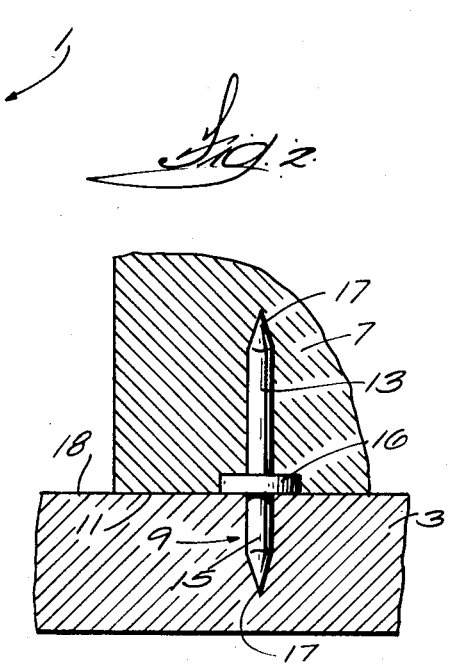
FIG. 2 is a sectional view taken along lines 2—2 of FIG. 1.
Figure 3:
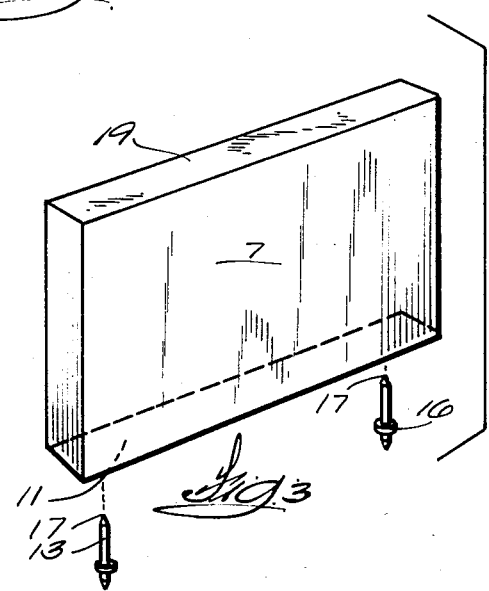
FIG. 3 is an exploded perspective view of a first partition used with the kit of the present invention.
Figure 4:
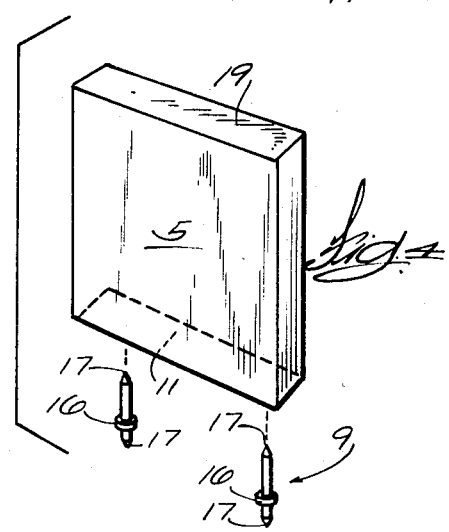
FIG. 4 is an exploded perspective view of a second partition used with the kit of the present invention.

Referring to FIG. 1, reference numeral 1 indicates an animal maze constructed with the kit of the present invention. The animal maze is particularly useful as a teaching aid for children's science classes. However, it will be understood that the invention is not limited to classroom applications.

The animal maze kit includes a bottom plate 3 which may be of any suitable size, shape, and material. A preferred size is a rectangle about 24 inches by 36 inches. The preferred material is ¾ inch solid plywood. An unlimited number of animal runway patterns may be created using generally rectangular partitions 5 and 7. In the preferred embodiment, the partitions are of two sizes. The first size, as indicated by reference numeral 5, is about 3⅞ inches long, and the second size, which is indicated by reference numeral 7, is about 10 inches long. Both sizes are about 5⅜ inches high, as that size is sufficient to retain small animals. The preferred material of partitions 5 and 7 is ¾ inch solid wood. The construction of the parts is very economical, and the partitions are easily handled by children.

Further, in accordance with the present invention, each partition 5 and 7 is provided with at least one and preferably a pair of fasteners 9 permanently embedded in the lower edges 11 thereof. Each fastener includes an upper shank 13 which is embedded a sufficient distance into the partition so that the fastener remains permanently gripped therein. Each fastener also includes a lower shank 15 which protrudes a suitable distance from the partition lower edge. In the preferred construction, the fastener has a diameter of about ⅛ inch, and lower shank 15 protrudes about ⅜ inches from the lower edge. As illustrated, the ends of the upper and lower shanks are formed with sharp points 17.

To provide a consistent protrusion of the fastener lower shanks 15 from lower edges 11 and to prevent the fasteners 9 from becoming more deeply embedded into the partitions 5 and 7 during use, as will become apparent hereinafter, the fasteners 9 are preferably provided with annular flanges 16. The flanges 16 serve the additional purpose of receiving the impacts for driving the fasteners into the partitions during the manufacturing process, thereby eliminating damage to the points 17 of the the lower shanks 13. The flanges may be received in suitable counterbores in the partition lower edges.

To construct a runway pattern using the kit of the present invention, the child or teacher merely places a partition 5 or 7 at any selected location on the top surface 18 of bottom plate 3, then the partition is secured to the bottom plate by striking the top edge 19 approximately above the fasteners 9 with a hammer. Only a few hammer blows are required for the lower shanks 15 of the fasteners 9 to become firmly inserted into the bottom plate and thus sturdily secure the partition in place. The flanges 16 prevent the fasteners from being more deeply embedded into the partitions due to the hammer blows. The locations of the partitions are not limited to orthogonal directions. Rather, the partitions may be used in any combination and at any angle to create an infinite variety of maze patterns. The ease with which a maze pattern may be constructed and altered using the kit of the present invention is especially appealing to children who like to experiment with different patterns and who are more interested in watching their pets than in constructing a maze. In addition, the rugged and inexpensive nature of the kit makes it ideal for school use.

To disassemble the animal maze 1, it is necessary only to pull the fastener lower shanks 15 from the bottom plate 3. Because of the relatively small diameter of fasteners, the bottom plate can be used repeatedly for creating numerous patterns before it needs replacement. Then, merely turning the bottom plate over presents an unused side.

Figure 5:
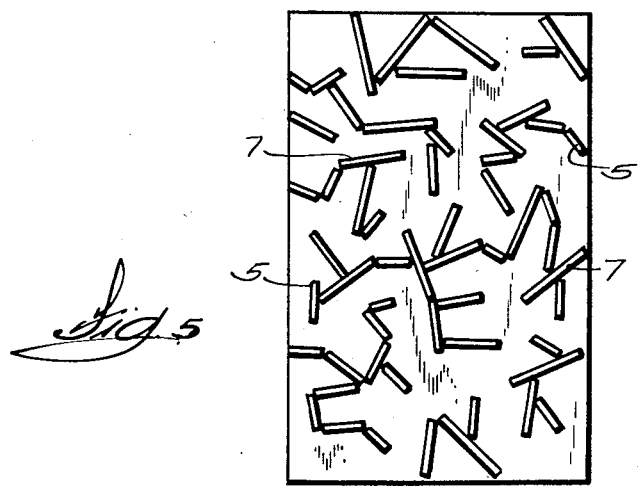
FIG. 5 is a top view on reduced scale.

Thus, it is apparent that there has been provided, in accordance with the invention, a kit for making an animal maze that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. FIG. 5 is illustrative of the versatility of the maze.

I claim:
1. A kit for making an animal maze comprising:
   (a) a plurality of generally rectangular partitions, each partition having a lower edge and a top edge and being relatively high to form an animal passageway;
   (b) at least one fastener permanently embedded in the lower edge of each partition, the fastener being formed with an annular projecting flange interposed between a first pointed shank embedded in the partition lower edge and a second pointed shank protruding from the partition lower edge said flange being embedded in and recessed within the lower edge of said partition; and
   (c) a bottom plate having a relatively wide and substantially imperforate top surface adapted to receive and releasably grip the fasteners when the fastener's lower shanks are inserted into the bottom plate at any point along said top surface to afford random orientation of said partitions for an indeterminate number of maze patterns with the lower edge of said partition being in continuous abutting contact with said top surface.

2. The kit of claim 1 wherein two flanged and pointed fasteners are embedded in the lower edge of each partition.

3. The kit of claim 1 wherein the kit includes at least two sizes of generally rectangular partitions.

* * * * *